US007072970B2

(12) United States Patent
Georgiou et al.

(10) Patent No.: US 7,072,970 B2
(45) Date of Patent: Jul. 4, 2006

(54) PROGRAMMABLE NETWORK PROTOCOL HANDLER ARCHITECTURE

(75) Inventors: Christos J. Georgiou, Scarsdale, NY (US); Monty M. Denneau, Brewster, NY (US); Valentina Salapura, Yorktown Heights, NY (US); Robert M. Bunce, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 09/682,688

(22) Filed: Oct. 5, 2001

(65) Prior Publication Data

US 2003/0067913 A1 Apr. 10, 2003

(51) Int. Cl.
G06F 15/16 (2006.01)
H04L 12/28 (2006.01)
H04L 3/22 (2006.01)

(52) U.S. Cl. ............... 709/230; 709/238; 370/389; 370/401; 370/466

(58) Field of Classification Search ............... 370/389, 370/401, 466; 709/230, 238
See application file for complete search history.

(56) References Cited

U.S. PATENT DOCUMENTS

| 4,674,034 | A | * | 6/1987 | Iwashita et al. ............ 711/169 |
| 5,047,919 | A | | 9/1991 | Sterling et al. |
| 5,159,686 | A | | 10/1992 | Chastain et al. |
| 5,353,418 | A | * | 10/1994 | Nikhil et al. ............... 718/108 |
| 5,404,521 | A | | 4/1995 | Murray |
| 5,428,766 | A | * | 6/1995 | Seaman ..................... 709/215 |
| 5,513,354 | A | * | 4/1996 | Dwork et al. ............... 718/106 |
| 5,519,867 | A | | 5/1996 | Moeller et al. |
| 5,560,029 | A | | 9/1996 | Papadopoulos et al. |
| 5,610,905 | A | * | 3/1997 | Murthy et al. ............... 370/401 |
| 5,640,584 | A | | 6/1997 | Kandasamy et al. |
| 5,649,135 | A | | 7/1997 | Pechanek et al. |
| 5,764,905 | A | | 6/1998 | Catozzi et al. |
| 5,812,811 | A | | 9/1998 | Dubey et al. |
| 5,815,727 | A | | 9/1998 | Motomura |
| 5,826,032 | A | * | 10/1998 | Finn et al. .................. 709/236 |
| 5,828,880 | A | | 10/1998 | Hanko |
| 5,835,763 | A | | 11/1998 | Klein |
| 5,881,248 | A | * | 3/1999 | Mergard .................... 710/100 |
| 5,913,925 | A | | 6/1999 | Kahle et al. |
| 6,047,002 | A | * | 4/2000 | Hartmann et al. .......... 370/466 |

(Continued)

Primary Examiner—John Follansbee
Assistant Examiner—Joshua Joo
(74) Attorney, Agent, or Firm—Whitham, Curtis, Christofferson & Cook, PC; Michael LaStrange (57) ABSTRACT

An architecture that achieves high speed performance in a network protocol handler combines parallelism and pipelining in multiple programmable processors, along with specialized front-end logic at the network interface that handles time critical protocol operations. The multiple processors are interconnected via high-speed interconnect, and each processor's memory is globally accessible by other processors. Each processor has multiple threads, each capable of fully executing programs. Each processors contains embedded dynamic random access memory (DRAM). Threads within a processor are assigned the processing of various protocol functions in a parallel/pipelined fashion. Data frame processing is done by one or more of the threads to identify relates frames. Related frames are dispatch to the same thread so as to minimize the overhead associated with memory accesses and general protocol processing. The high-speed protocol handler may also provide built-in monitors for examining the activity of its hardware resources and reallocating the workload to the resources that are not heavily used, thus balancing the resource utilization and increasing the workload throughput.

20 Claims, 9 Drawing Sheets

U.S. PATENT DOCUMENTS

| | | |
|---|---|---|
| 6,079,008 A | 6/2000 | Clery, III |
| 6,085,233 A | 7/2000 | Jeffrey et al. |
| 6,092,175 A | 7/2000 | Levy et al. |
| 6,105,127 A | 8/2000 | Kimura et al. |
| 6,128,720 A | 10/2000 | Pechanek et al. |
| 6,393,026 B1 * | 5/2002 | Irwin .......................... 370/401 |
| 6,606,704 B1 * | 8/2003 | Adiletta et al. ............. 712/248 |
| 6,629,257 B1 * | 9/2003 | Hartwell ..................... 713/502 |
| 6,895,013 B1 * | 5/2005 | Burns et al. ................ 370/401 |
| 2001/0025324 A1 * | 9/2001 | Gamo ......................... 709/315 |

* cited by examiner

PROGRAMMABLE NETWORK PROTOCOL HANDLER ARCHITECTURE

BACKGROUND OF THE INVENTION

1. Field of the Invention

The present invention generally relates to network communications systems and, more particularly, to a programmable network protocol handler architecture that achieves high speed performance.

2. Background Description

Currently available network protocol handlers are implemented as hardwired logic, but there are also several programmable implementations. Custom integrated circuits (ICs), or application specific integrated circuits (ASICs), achieve good performance, but are inflexible solutions and are inefficient to handle emerging or evolving network architectures. Programmable protocol handlers are based either on a single processor implementation (which may be embedded on a chip or implemented off chip) or have multiple pico-processors controlled by a hierarchical controller (such as the IBM PowerNP network processor). All these solutions have dynamic random access memory (DRAM) external to the chip.

Programmable architecture is easier to implement than hardwired logic. Changes to specification can be easily accommodated by changing the program, and the architecture can be personalized to handle different protocols. However, current programmable engines based on single reduced instruction set computer (RISC) architecture (such as the QLogic ISP2300 Fibre Channel processor) are not fast enough for handling multi-gigabit/second (e.g., 10 Gb/s) transmission bit-rates.

In the prior art, protocol handler chips consist of hardwired logic that handles time critical operations, buffers, and a processor engine for executing high-level protocol commands and managing the overall chip function. In such chips, typically only one resource is assigned to execute a particular protocol task. Thus, such resources can become performance bottlenecks when the network traffic workload is increased.

BRIEF SUMMARY OF THE INVENTION

It is therefore an object of the present invention to provide an architecture that achieves high speed performance in a network protocol handler. In the preferred embodiment, the Fibre Channel protocol is implemented; however, the architecture can be the basis for implementing many other network protocols; e.g., Giga-Ethernet, Infiniband or Internet protocol (IP) over small computer system interface (i-SCSI).

This invention introduces a programmable system based on a multiple processor and multiple threads architecture containing embedded DRAM. The architecture offers the advantages of being easily programmable, and providing balanced computing resources. This is particularly important for the future implementation of emerging protocols (such as, for example, 10 Gb/s Fibre Channel, 10 Gb/s Ethernet, etc.), since the functionality and computing requirements of such networks are still not completely specified. A single network processor may not have the computing capabilities to handle all the requirements of a very complex protocol, while bundling multiple processors to work in parallel on a single job may be hard to accomplish.

In the architecture according to the invention, performance is achieved via a combination of parallelism and pipelining, along with specialized front-end logic that handles time critical protocol operations. More specifically, a front-end hardwired logic at the network interface handles time critical operations, such as encoding/decoding, cyclic redundancy check (CRC) generation/checking, interpretation of some header bits and functions, etc. Multiple processors are used. These processors are interconnected via the processors's high-speed interconnect, which can be implemented as a ring, switch bus, or any other processor interconnect architecture. Each processor has multiple threads, each capable of fully executing programs, and each processor's memory is globally accessible by other processors. Each processor has a memory hierarchy, consisting of embedded dynamic random access memory (DRAM) and can include data caches, instruction caches, scratch pad static random access memory (SRAM), or any combination of these memory elements. Threads within a processor are assigned the processing of various protocol functions in a parallel/pipelined fashion. Data frame processing is done by one or more of the threads to identify relates frames. Related frames are dispatched to the same thread so as to minimize the overhead associated with memory accesses and general protocol processing.

The invention also addresses the problem of serialization bottlenecks arising from the use of single resources by using multiple on-chip resources and a method for monitoring resource activity and reallocating the workload to the resources that are being least used.

BRIEF DESCRIPTION OF THE SEVERAL VIEWS OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Detailed Description of a Preferred Embodiment of the Invention

Figure 1:
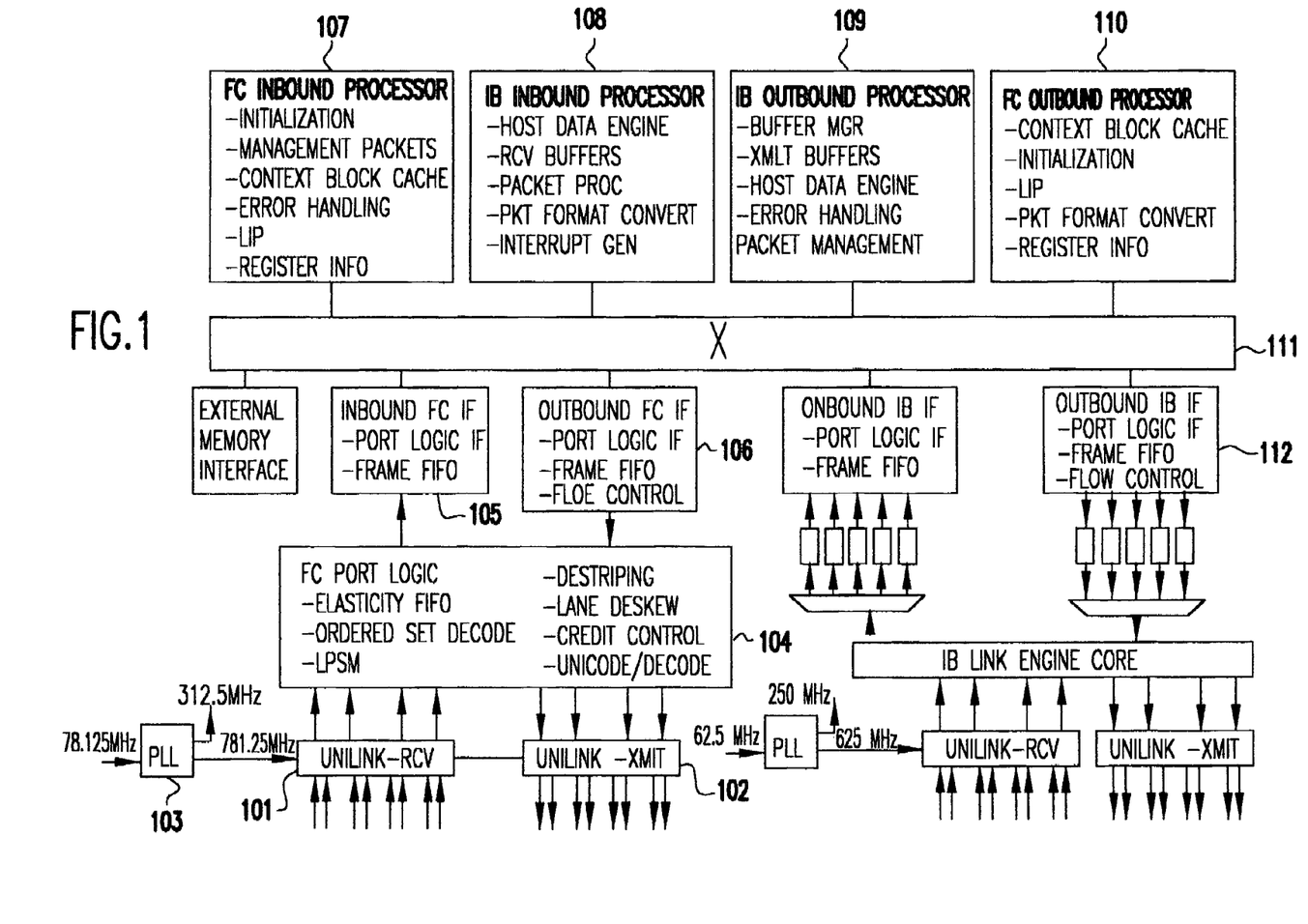
FIG. 1 is block diagram showing the overall programmable architecture according to the invention.

Referring now to the drawings, and more particularly to FIG. 1, there is shown the overall programmable architecture according to the invention. This architecture handles network traffic from one network protocol, performs traffic conversion from the first network protocol to a second network or bus protocol, and handles traffic of the second network or bus protocols. In our preferred embodiment, the architecture handles traffic from Fibre Channel and Infiniband network architectures. Connection to a network physical communication system is by means of receiver 101 and transmitter 102 supplied by a clock signal from a phase locked loop (PLL) 103. The receiver 101 and transmitter 102 are connected to hard-wired channel (FC port logic 104 which outputs frame data to an inbound FC interface (IF) 105 and receives frame data from an outbound FC interface (IF) 106.

As seen in FIG. 1, the preferred embodiment of four processors 107, 108, 109, 110, connected by interprocessor high-speed interconnect 111, are assigned the tasks of handling network protocol, but any number of processors can be assigned to handle network protocol tasks, depending on the capabilities of the processors and of the complexity of the network protocol. Fibre Channel input traffic is handled by FC Inbound Processor 107, traffic into the Infiniband network is handled by the IB Outbound Processor 109, outbound traffic into the Fibre Channel network is handled by FC Outbound Processor 110, and traffic coming from the Infiniband network is handled by IB inbound processor 108. Within each processor 107, 108, 109, or 110, several identical threads perform various protocol sub-tasks.

Figure 2:
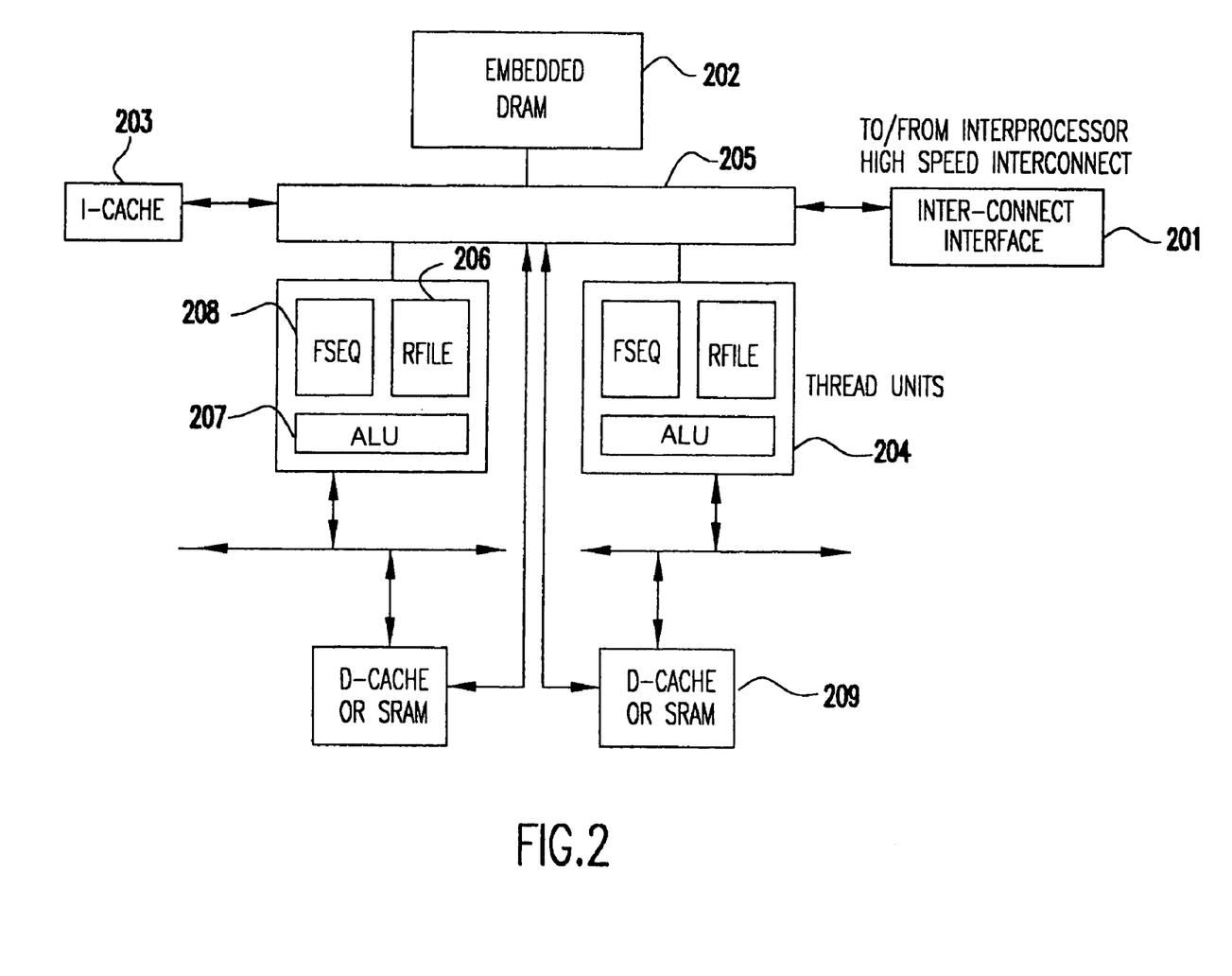
FIG. 2 is a block diagram showing the architecture and the memory hierarchy of one of the processors used in the system of FIG. 1.

FIG. 2 shows in more detail the parallel architecture of the processors 107 through 110. Inter-processor communication is implemented by means of the high-speed interconnect interface 201 which provides bi-directional data flow between this processor and the other elements of the system shown in FIG. 1. The processor incorporates embedded DRAM 202 which is a local memory of this processor, but which is accessible in part or as a whole by other processors globally. The processor contains also one or more instruction caches 203, and multiple identical thread units 204. The processor elements communicate via a high-speed interconnect device 205, which can be implemented as a local bus, switch, or any other implementation.

Each thread unit 204 incorporates a register file (Rfile) 206, a program counter, an arithmetic logic unit (ALU) 207, and logic for instruction fetching, decoding and dispatching 208. A single thread unit 204 can or can not have logic for instruction pre-fetching and storing, branch prediction mechanisms and logic for out-of-order execution and speculation. The processor can have multiple data caches (D-caches) 209, dedicating one cache block to each thread unit, or sharing a single D-cache block among several thread units 204. Instead of having a data cache, or in addition to it, an implementation can have a scratch pad memory, again shared between multiple thread units, or being local to only one thread unit 204.

Referring back to FIG. 1, inbound frames are first stored in frame first-in, first-out registers (FIFOs) at the FC interface 105. These can be dual FIFOs that operate in ping-pong fashion to prevent frame overruns or can be implemented as a single FIFO. In the preferred embodiment, associated with the FIFOs are two addresses, one pointing to a memory area in the FC inbound processor 107 where the header of an incoming frame will be written into, and the other pointing to a memory area in the ID outbound processor 109, for writing the payload of the frame (i.e., the data). Or in another embodiment, only one address is associated with the FIFO block, storing both the header and the payload of the frame. These addresses are set by the FC inbound processor 107 that manages the respective memory areas. Once a frame begins arriving into the FIFO, the FIFO logic moves first the header and then the payload into the preassigned inbound data block (IBDB) areas over the highspeed interconnection device.

Figure 3:
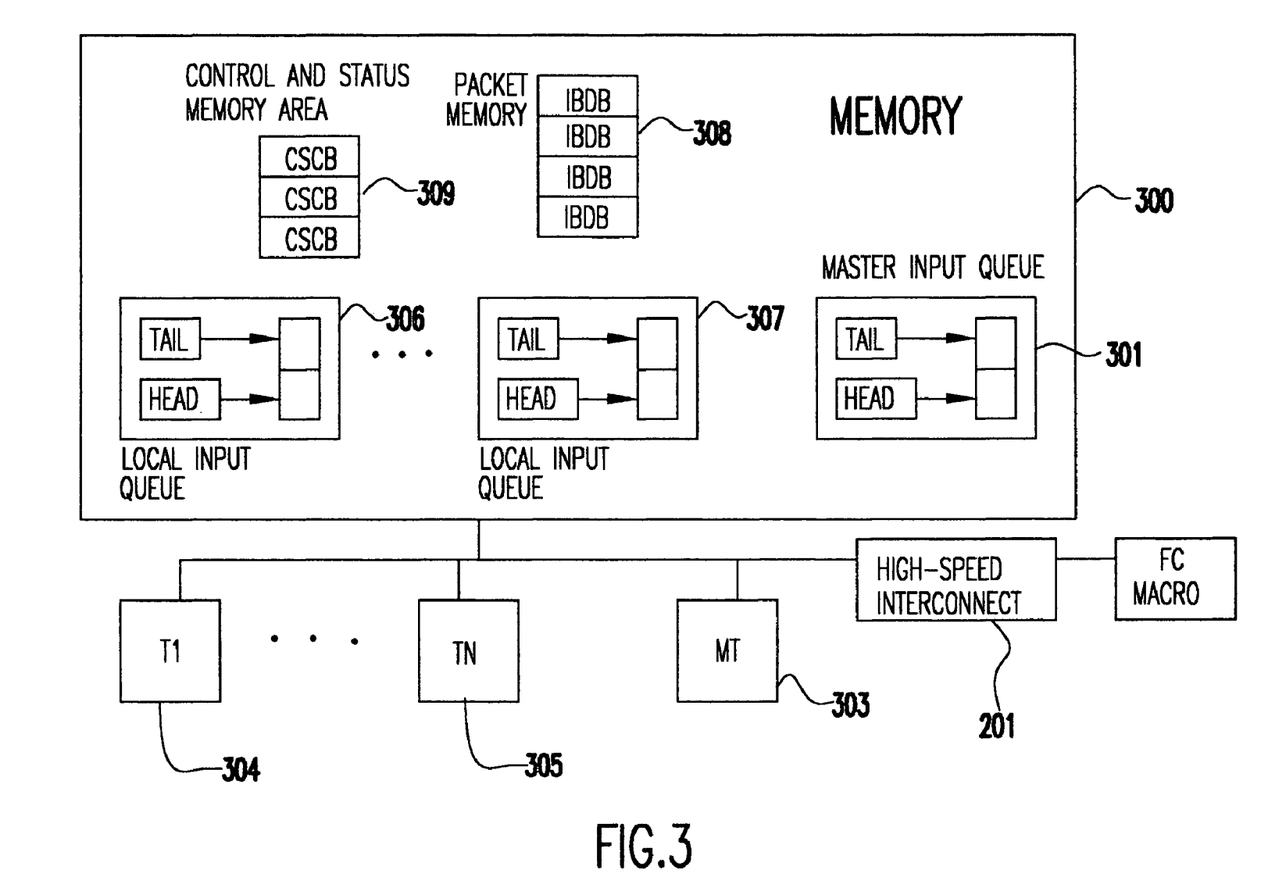
FIG. 3 is a block diagram showing the logical memory management and thread allocation technique.

As shown in FIG. 3, the beginning addresses of the two parts of the IBDB block or a single address of the IBDB block is added to a master input queue 301 by the thread 303 which manages the IBDB memory area. Then, this "master" thread assigns the incoming frames to one of the fixed number of threads 304 through 305 performing FC protocol. The frame dispatching is performed by a workload allocation function.

FIG. 3 shows the logical assignment of thread units of a processor 107 to protocol tasks and the logical organization of the memory 300. Memory 300 contains an area dedicated for packet storage 308, where the payload and headers of the frames are stored, an area for storing control and status blocks (SSCB and ESCB) 309, where various protocol specific information and the current status of the network traffic is stored, and area for working queues, where master input queue 301 and local input queues 306 to 307 are stored, as well as any other information required.

Several identical processor threads perform FC protocol tasks on the incoming frames. The protocol thread fetches the IBDB address of the frame from its corresponding local input queue, and uses it to access the frame header. Then, it fetches the control blocks associated with the frame from the memory (ESCB and SSCB), to begin frame processing. The FC protocol tasks include context switch, frame validation, frame reordering and acknowledgment generation. Once all required FC protocol tasks have been performed for a single frame, the IBDB address of the next frame is fetched from the local queue. If the local input queue is empty, the protocol thread goes into the "idle" state. In the "idle" state, the processor can check for new data by polling its local queue, or can wait for an interrupt or some particular external signal to get the new IBDB address.

Input Processing Unit

Figure 4:
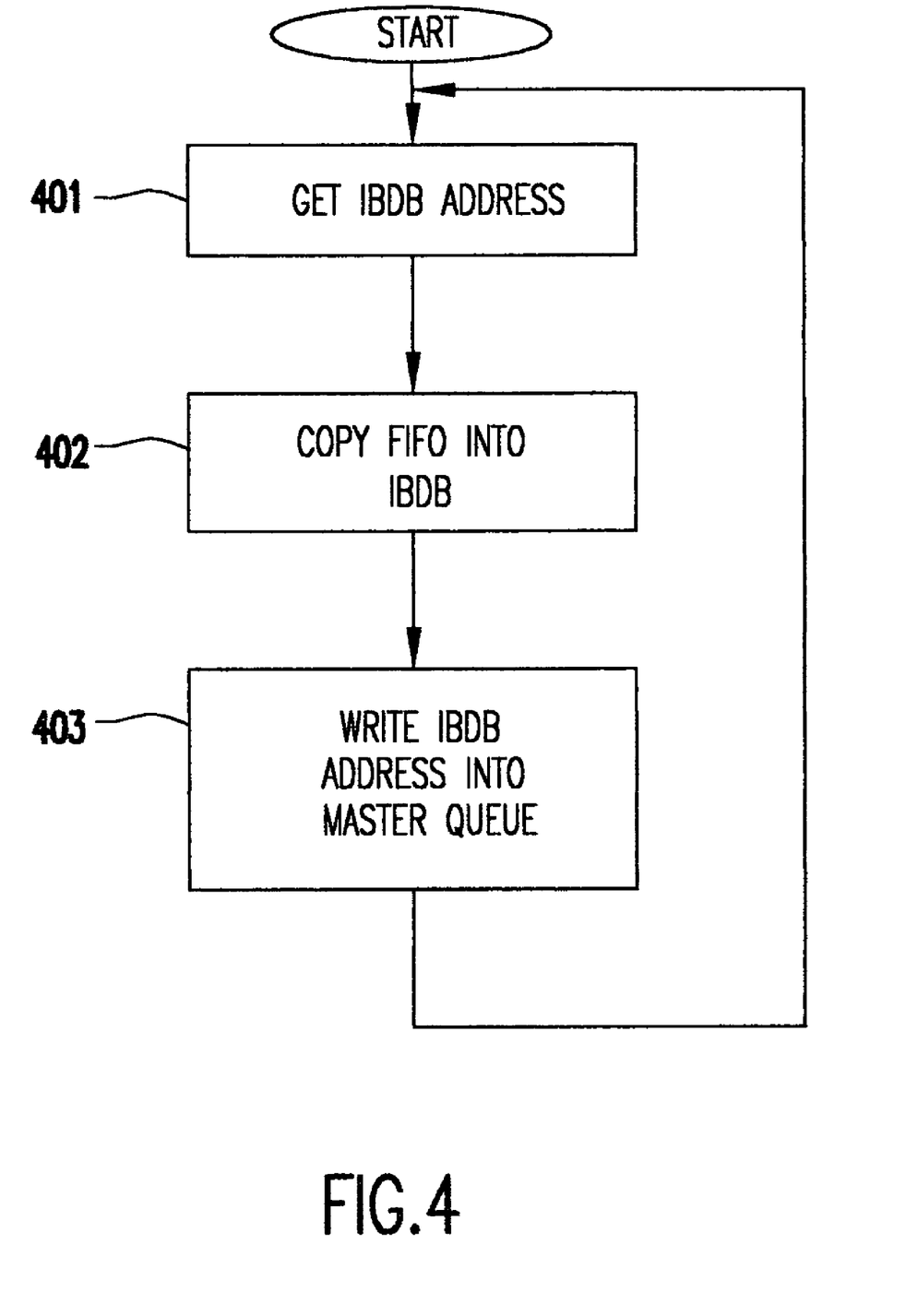
FIG. 4 is a flow diagram showing the process in which an inbound data block (IBDB) address is added to the master queue.

The task of the input processing unit is to copy data from the inbound FIFO to the packet memory 308, and to add the new IBDB address to the master input queue 301. This process is shown in FIG. 4. The process begins by retrieving the IBDB address in function block 401. The contents of the FIFO are copied into the IBDB in function block 402. The IBDB address is then written into the master queue in function block 403 before the process loops back to function block 401.

In one embodiment, the input processing unit can be implemented as a software application running on a dedicated thread. In another embodiment, this task can be performed by a direct memory access (DMA) unit with incorporated functionality 403 to add the IBDB address to the master input queue 301.

For each new packet, an address of the next free IBDB memory block has to be provided. This is done by reading the "first free IBDB pointer" from the chain of free IBDBs, and then adjusting the first free IBDB pointer to the next IBDB block in the chain. In the preferred embodiment, memory blocks for data and control areas are organized as a chain of free blocks, where the first element of the block contains the address of the next free memory block, but the memory can be organized in any other way.

Figure 5:
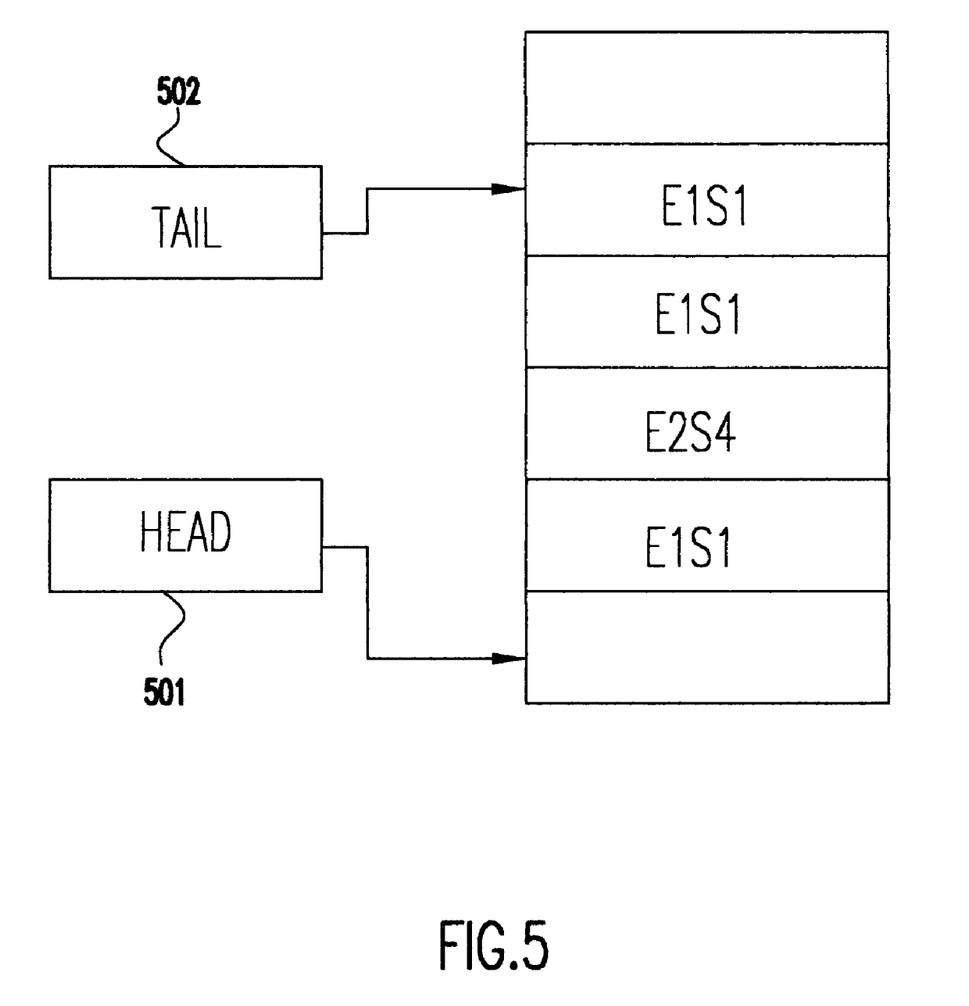
FIG. 5 is a block diagram showing the organization of the input queue as a ring buffer.

All input queues in this architecture are organized as ring buffers, with the first and last valid buffer locations recorded in the head and tail pointers 501 and 502 of the particular queue, respectively, as shown in FIG. 5. The head and tail pointers for each queue can be implemented as dedicated registers in hardware, or can be stored in the memory on the previously determined locations. In the latter case, the addresses of the memory locations containing these pointers are determined before the processing has begun and are not changed during the processing. In addition, the queues themselves can be implemented as dedicated hardware or can be stored in the memory on the previously determined locations.

Master Thread

The master thread dispatches the incoming frames to one of the threads performing FC protocol. To accomplish this, some packet assignment method is used. This is accomplished by using some workload allocation function, which can be implemented by using some well known method, e.g., table lookup, round-robin, first-come, first-servers, etc., or can be implemented to use data from the frame header or from the frame payload for allocating the frame to a particular thread.

To allocate the incoming frame to one of the threads performing the FC protocol, the master thread first fetches the address of the IBDB memory block of the incoming frame from the master input queue. Then, the workload allocation function is performed. If the workload allocation function requires data from the frame, these data are first fetched, and then the workload allocation function is performed. The result of the allocation function is the dispatching information, and the frame is assigned for processing to the corresponding protocol thread.

Figure 6:
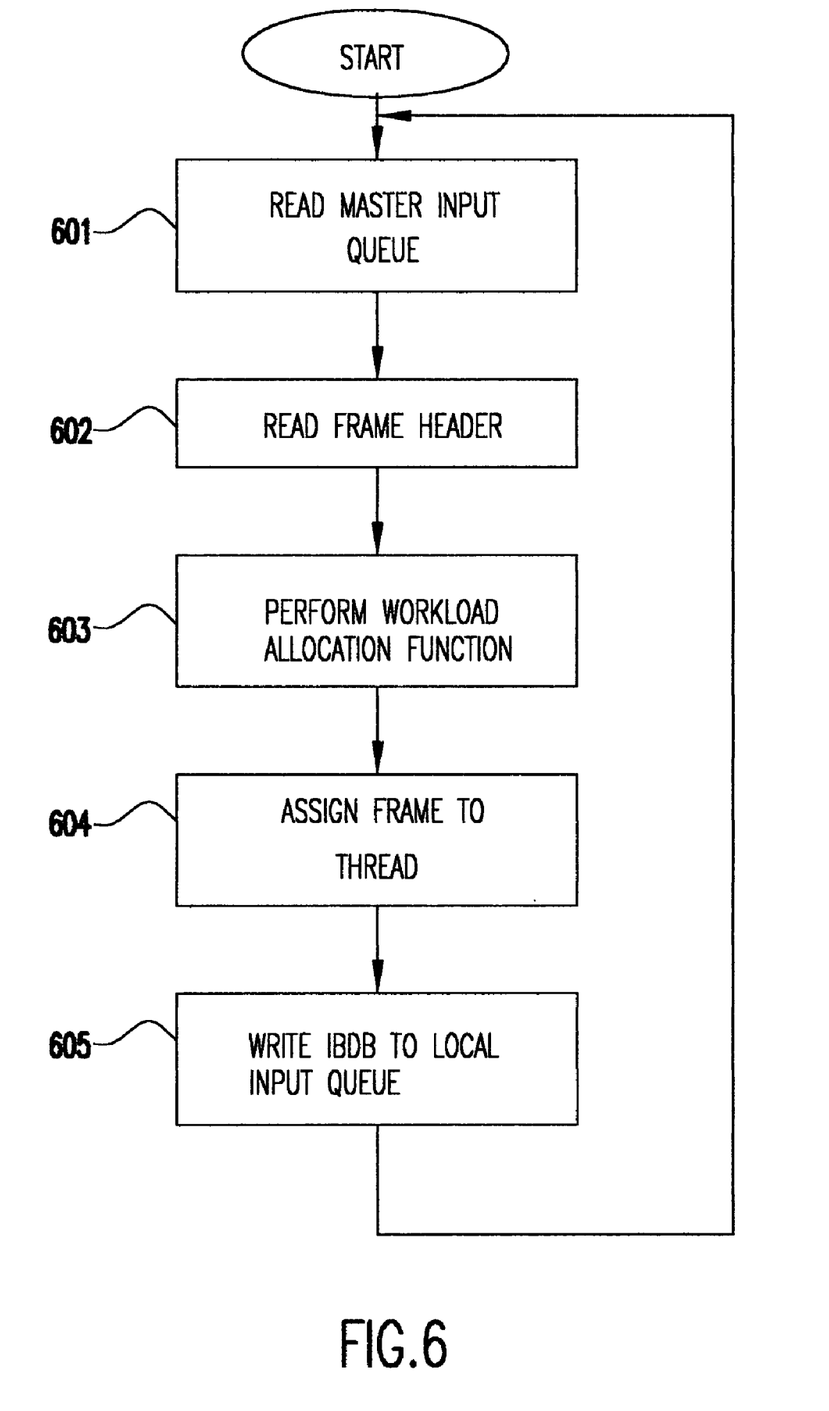
FIG. 6 is a flow diagram showing the process by which the master thread moves the IBDB address of the frame from the master input queue to the local input queue of the particular thread.

Once a frame has been assigned to a protocol thread, the master thread moves the IBDB address of the frame from the master input queue to the local input queue of the particular thread, as shown in FIG. 6. The process begins by reading the master input queue in function block 601. If frame data are required for the workload allocation function, these are fetched in function block 602. A workload allocation function is performed in function block 603, and then the frame is assigned to a thread in function block 604. The IBDB is written to the local input queue in function block 605 before the process loops back to function block 601.

Protocol Thread

There is a fixed number of protocol threads in our preferred embodiment. The protocol threads are identical and perform FC protocol-specific tasks. These tasks include context switch, frame validation, frame reordering and acknowledgment generation.

Figure 7:
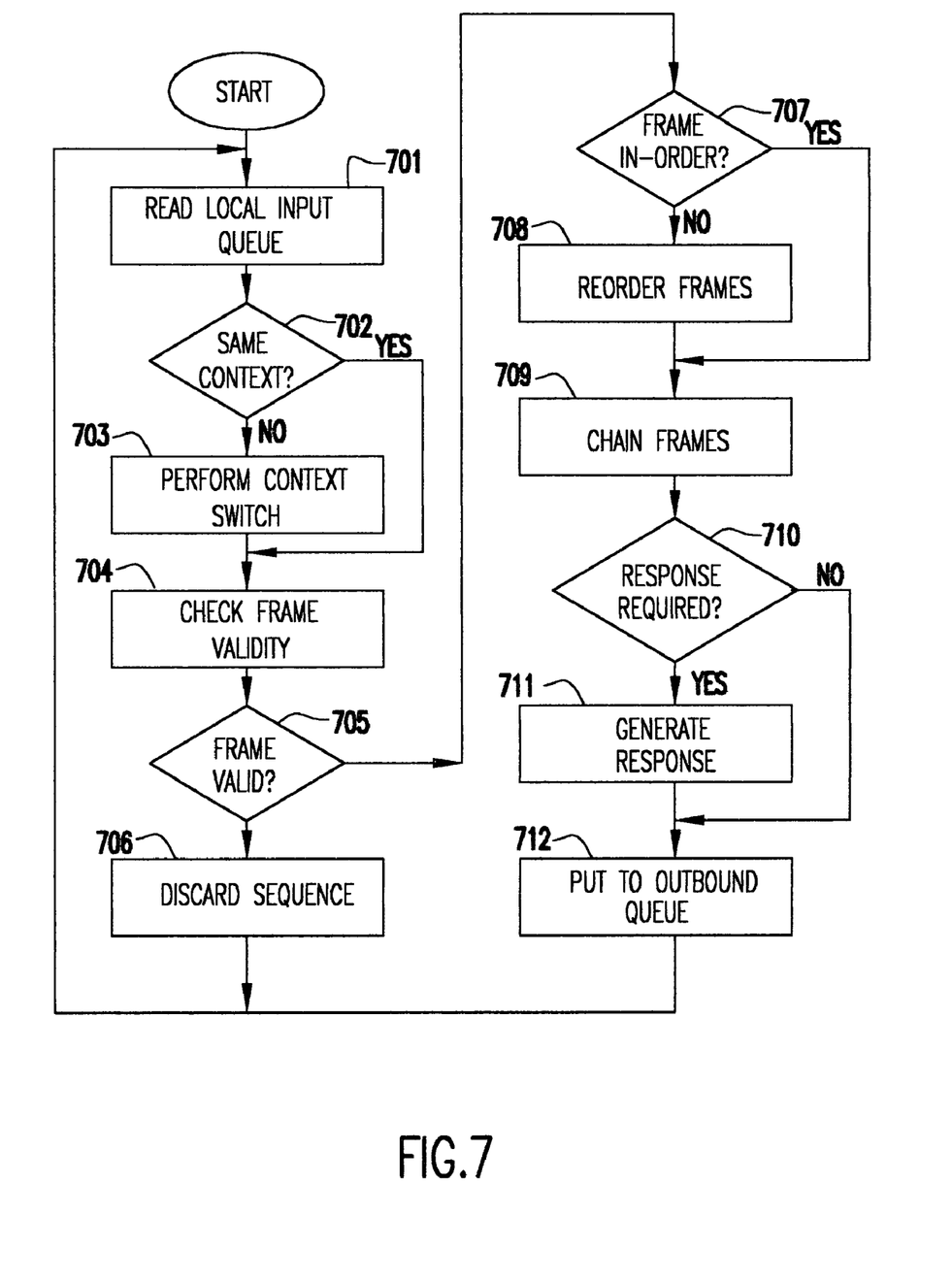
FIG. 7 is a flow diagram showing the process of allocating a thread to do the transfer of data from the inbound to the outbound processor.

Referring now to FIG. 7, the address of the IBDB block of a data frame is fetched from the local input queue of the protocol thread in function block 701. If a protocol thread is idle, the tail of the local queue is polled. The polling frequency is kept low, to reduce bus traffic.

To fetch the IBDB data from the local queue, the IBDB address from the location addressed by the ring buffer's tail 502 is read (see FIG. 5). The ring buffer tail address 502 is adjusted to the next location, and it is checked to see if the input queue is empty by comparing the addresses of the ring buffer's head 501 and tail 502.

The data frame is accessed using the IBDB address, and protocol tasks can be performed. The protocol thread fetches several data words from the frame header in the IBDB memory block, and compares it with the cached data in decision block 702. If the comparison shows that the frame belongs to the same sequence as the previous frame processed by that thread, neither context switching nor new data fetching needs to take place. Otherwise, context switching is performed in function block 703 and required data are fetched from the corresponding exchange and sequence status control blocks (ESCB and SSCB) from memory. Checking for the context switch reduces the number of memory accesses and bus traffic significantly, thus boosting overall performance.

The frame is then checked for validity in function block 704 and a determination is made in decision block 705 as to whether the frame is valid. If it is not, the sequence is discarded in function block 706, and the process loops back to function block 701. If the frame is valid and for certain classes of service, a determination is made in decision block 707 as to whether it has been received in order. If the frame has been received out of order and it is to class 2 service, it is placed in a reorder table in function block 708, so that the sequence can be delivered in its proper order.

The frame is chained to the previously received frame from the same sequence in function block 709. The chaining and reordering mechanism enables the system to link multiple data blocks in a single data stream, keeping the information needed to find the next data block in the sequence locally in the data block.

If the frame requires a response to be generated to the sender as determined in decision block 7 10, such as acknowledgment or busy message, a response frame is constructed in function block 711. All required data for the response are collected in an OBDB (outbound data block) block and the pointer of the OBDB block is sent to the outbound processor 110 (FIG. 1), which composes and transfers the response frame. The FC outbound processor 110 composes the response frame and transfers it to the outbound FIFO in the FC interface 106 in FIG. 1. The IBDB address of the data frame is then placed in the work queue of the thread for transferring the data to the host interface FIFO 112 (FIG. 1), as shown in the function block 712. This task is performed by the Infiniband outbound processor 109 (FIG. 1). From here, the data are sent to the Infiniband network.

It is also an object of the present invention to allocate the protocol handler resources, i.e., processors, memories and high-speed interconnect, based on the demand requirements of the workload. The monitoring of the activity of the various resources takes place as follows.

Processor Resources:

In the FC inbound processor 107 (FIG. 1) there is a master thread that assigns the processing of incoming frame headers to protocol threads. This is done by the master thread placing requests in queues stored in memory. When these queues become large, indicating that the processing of the frames has slowed down, the master thread can create request service queues in another processor's memory (such as the IB outbound processor 109), thus having threads in that processor service new incoming frames. This will reduce the workload in the FC inbound processor, thus increasing protocol handler performance.

Figure 8:
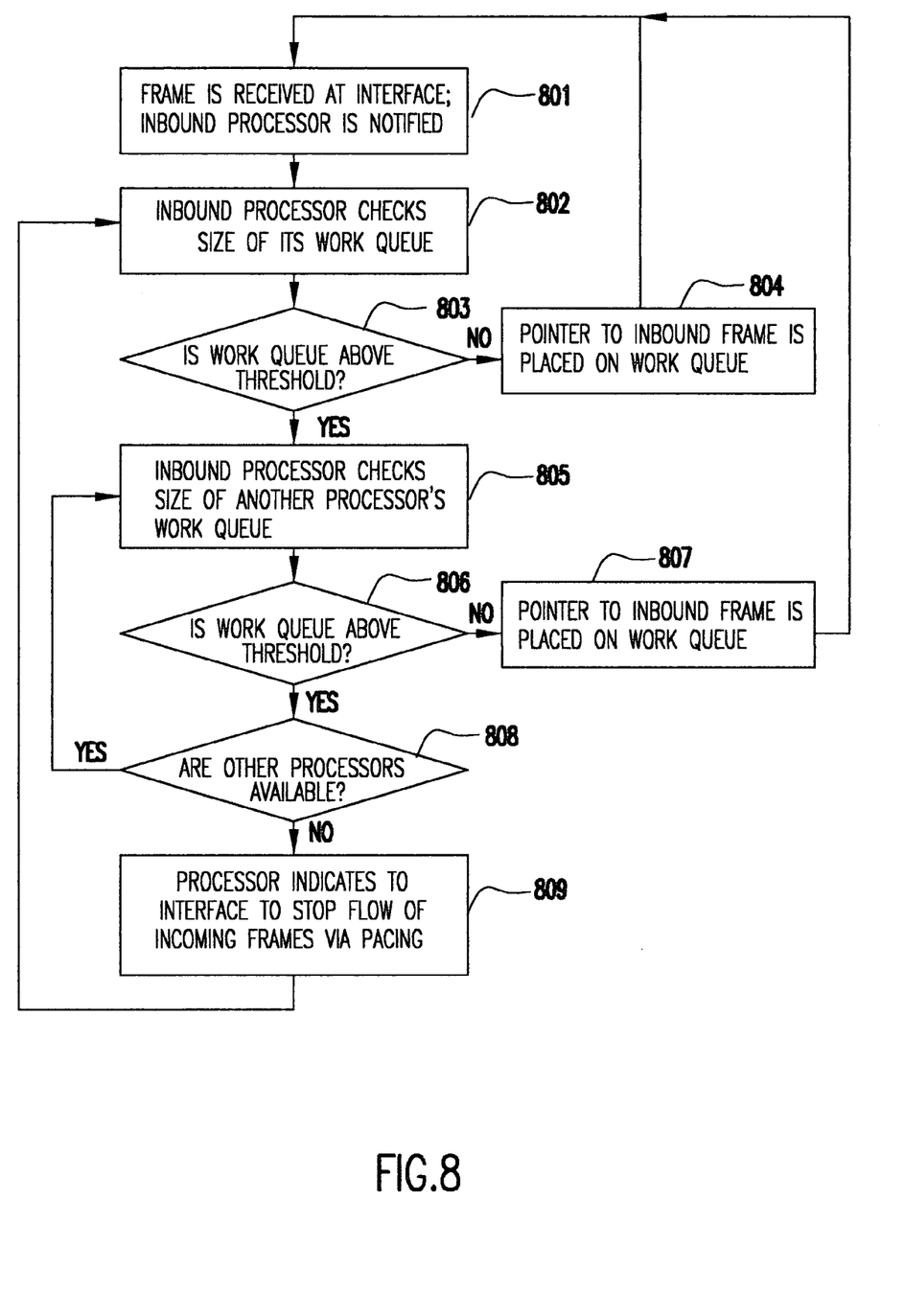
FIG. 8 is a flow diagram showing the process of monitoring and reallocating processor resources.

The process is shown in FIG. 8 and begins when a frame is received at the interface in function block 801. When this occurs, the inbound processor is notified and, in response, the inbound processor checks the size of its work queue in function block 802. A determination is made in decision block 803 as to whether the work queue is above a predetermined threshold. If not, the pointer to the inbound frame is placed on the work queue in function block 804, and the process loops back to function block 801 to await the next frame, If, however, the threshold is exceeded, the inbound processor checks the size of another processor's work queue in function block 805. A determination is made in decision block 806 as to whether the work queue of the other processor is above the threshold. If not, a pointer to the inbound frame is placed on the work queue of the other processor in function block 807, and the process loops back to function block 801 to await the next frame. If, however, the threshold is exceeded in the other processor's work queue, a determination is made in decision block 808 as to whether there are any of other processors available. If so, the process loops back to function block 805 to check that processor's work queue; otherwise, the processor indicates to the interface to stop flow of incoming frames via pacing in function block 809. The process then loops back to function block 802 where the inbound processor again checks the size of its work queue.

Incoming frames are separated into header and payload parts, and the header is stored in the memory of the FC inbound processor 107 while the payload is stored in the memory of the IB outbound processor 108, so that it can be properly formatted for delivery to a destination in the Infiniband network. Associated with each processor's memory is a memory free list that provides to available memory blocks. If the free list associated with a processor's memory is about to become empty, indicating that there is not any more available memory for storing incoming frames in that processor, the master thread that assigns memory blocks to the incoming frames can examine the free lists in other processors to determine the availability of corresponding memory. Then, the master thread can redirect the incoming traffic to a processor whose memory is under utilized.

Figure 9:
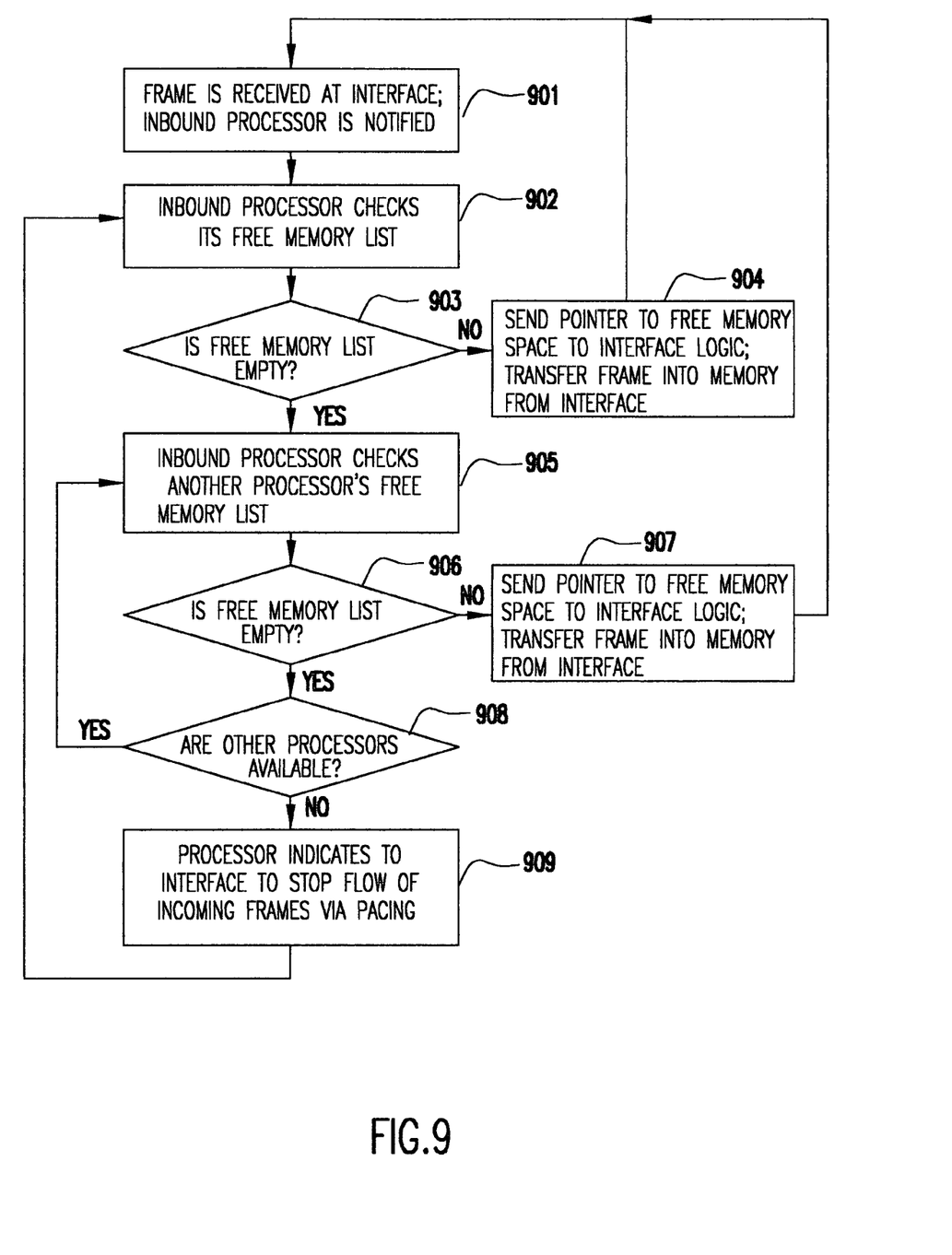
FIG. 9 is a flow diagram showing the process of monitoring and reallocating memory resources.

The process is shown in FIG.9 and begins with a frame being received at the interface in function block 901. When this occurs, the inbound processor is notified and, in response, the inbound processor checks the size of its free memory list in function block 902. A determination is made in decision block 903 as to whether the free memory list is empty. If not, a pointer to free memory space is sent to the interface logic and the frame is transferred into memory from the interface in function block 904, and the process loops back to function block 901 to await the next frame. If, however, the free memory list is empty, the inbound processor checks another processor's free memory list in function block 905. A determination is made in decision block 906 as to whether the free memory list of the other processor is empty. If not, a pointer to free memory space is sent to the interface logic and the frame is transferred into memory from the interface logic in function block 907, and the process loops back to function block 901 to await the next frame. If, however, the free memory list of the other processor is empty, a determination is made in decision block 908 as to whether there are any other processors available. If so, the process loops back to function block 905 to check that processor's free memory list; otherwise, the processor indicates to the interface to stop flow of incoming frames via pacing in function block 909. The process then loops back to function block 902 where the inbound processor again checks the size of its free memory list.

Interconnection Resources:

As previously stated, the high-speed interconnect among processors can be implemented as a ring, bus, or any other processor interconnect architecture, but in the preferred embodiment, the processor interconnect is implemented as dual counter-rotating rings. If a packet needs to be sent to another processor, the ring interface logic at the processor selects the ring that provides the shortest distance to the destination and places the packet into that ring. If the ring is busy at the time because another packet is in transit, it waits until the ring becomes available again. Alternatively, it can place the packet on the other ring. The performance of the interconnection rings can be optimized by balancing their workloads. This can be done by the ring interface logic which monitors the traffic on both rings by counting the packets that pass by, thus determining which ring has less traffic. The ring interface logic can then try first to place its packet on the ring that has the least traffic. This will minimize the possibility of waiting for other packets upstream and downstream.

While the invention has been described in terms of a single preferred embodiment, those skilled in the art will recognize that the invention can be practiced with modification within the spirit and scope of the appended claims.

What is claimed is:

1. A system for converting network communications data between multiple communications protocols, the system comprising:
   a high speed interconnect;
   a plurality of programmable processors, each processor having multiple hardwired thread units, each said hardwired thread unit being capable of fully executing programs, wherein an inbound processor is pipelined with an outbound processor through said interprocessor high-speed interconnect, wherein the hardwired thread units are operable for performing communications protocol conversion of data frames, and wherein the processors perform the protocol conversion processing and data frame routing to another of said plurality of processors in parallel with at least one of said inbound processor and said outbound processor if a data frame is not related to a data frame currently being processed in a given processor, if the work queue of a given processor is above a threshold, or if a free memory list of a given processor is empty;
   a hardwired logic front end connected to a network interface for receiving and transmitting data, said hardwired logic performing time critical operations and communicating received data to and data to be transmitted from said plurality of programmable processors; and
   wherein the protocol conversion of data frames is performed such that related data frames are dispatched to the same hardwired thread unit.

2. The system recited in claim 1, wherein each of said programmable processors includes on-chip embedded memory for storing status and control information of current network traffic and for storing received data and data to be transmitted.

3. The system recited in claim 2, said embedded memory contains an area dedicated for packet storage, an area where the payload and headers of frames are stored, an area for storing control and status blocks, an area where various protocol specific information and the current status of the network traffic is stored, and an area for working queues, as well as any other information required.

4. The system recited in claim 3, wherein a beginning address of an inbound data block (IBDB) is added to the mast input queue by an input processing unit which manages an IBDB memory area, a "master" thread assigning incoming frames to one of a number of threads performing a network protocol, frame dispatching being performed by a workload allocation function which may include workload balancing functionally.

5. The system recited in claim 2, wherein each of said programmable processors includes an on-chip high-speed interconnect connecting the embedded memory and said multiple thread units.

6. The system recited in claim 5, wherein each of said multiple thread units comprises a register file, a program counter, an arithmetic logic unit (ALU), and logic for instruction fetching, decoding and dispatching.

7. The system recited in claim 5, wherein the on-chip high-speed interconnect is implemented as a ring.

8. The system recited in claim 5, wherein the on-chip high-speed interconnect is implemented as dual counter rotating rings.

9. The system recited in claim 5, wherein the on-chip high-speed interconnect is implemented as a local bus.

10. The system recited in claim 5, wherein the on-chip high-speed interconnect is implemented as a switch.

11. The system recited in claim 5, further comprising an interprocessor high-speed interconnect connecting said plurality of programmable processors and said hardwired logic front end, and an interconnect interface connecting the on-chip high-speed interconnect of each programmable processor to the interprocessor high-speed interconnect.

12. The system recited in claim 11, wherein said hardwired logic front end comprises:
   a receiver and a transmitter connected to port logic, said receiver outputting received frame data according to a first protocol and said transmitter receiving frame data according to the first protocol;
   an inbound interface which receives frame data output by said port logic; and
   an outbound interface which outputs frame data to be transmitted to said port logic, said inbound interface and said outbound interface being connected to said interprocessor high-speed interconnect;
   a second receiver and a second transmitter connected to second port logic, said second receiver outputting received frame data according to a second protocol and said second transmitter receiving frame data according to the second protocol;
   a second inbound interface which receives frame data output by said second port logic; and
   a second outbound interface which outputs frame data to be transmitted to said second port logic, said second inbound interface and said second outbound interface being connected to said interprocessor high-speed interconnect.

13. The system recited in claim 12, further comprising a phase locked loop supplying clock signals to said receiver and said transmitter.

14. The system recited in claim 2, further comprising:
   built-in monitors for examining activity of hardware resources; and
   means for re-allocating workload to resources that are not heavily utilized.

15. The system recited in claim 14, wherein the built-in monitors examine work queues of said programmable processors.

16. The system recited in claim 14, wherein the built-in monitors examine memory resources of said programmable processors.

17. The system recited in claim 14, wherein the built-in monitors examine memory resources of said programmable processors.

18. The system as recited in claim 1, wherein the system converts between two protocols, and the system comprises four processors, and wherein:
   a first processor provides inbound processing for a first protocol;
   a second processor provides outbound processing for the first protocol;
   a third processor provides inbound processing for a second protocol; and
   a fourth processor provides outbound processing for the second protocol.

19. The system recited in claim 1, wherein respective hardwired thread units of each said processor are capable of processing respective data frames in parallel for respective data frames.

20. The system recited in claim 1, wherein each processor is capable of accessing memory of other processors.

* * * * *